(12) United States Patent
Kanto

(10) Patent No.: US 12,496,605 B2
(45) Date of Patent: Dec. 16, 2025

(54) INFORMATION PROCESSING DEVICE AND INFORMATION PROCESSING SYSTEM

(71) Applicant: DMG MORI CO., LTD., Nara (JP)

(72) Inventor: Kenta Kanto, Nara (JP)

(73) Assignee: DMG MORI CO., LTD., Nara (JP)

( * ) Notice: Subject to any disclaimer, the term of this patent is extended or adjusted under 35 U.S.C. 154(b) by 386 days.

(21) Appl. No.: 17/830,080

(22) Filed: Jun. 1, 2022

(65) Prior Publication Data

US 2022/0288618 A1 Sep. 15, 2022

Related U.S. Application Data

(63) Continuation of application No. PCT/JP2021/002589, filed on Jan. 26, 2021.

(30) Foreign Application Priority Data

Feb. 12, 2020 (JP) ................................. 2020-021367

(51) Int. Cl.
*B05B 13/04* (2006.01)
*B23Q 11/00* (2006.01)
*G05B 19/402* (2006.01)

(52) U.S. Cl.
CPC ...... *B05B 13/0431* (2013.01); *B23Q 11/0075* (2013.01); *G05B 19/402* (2013.01)

(58) Field of Classification Search
None
See application file for complete search history.

(56) References Cited

U.S. PATENT DOCUMENTS 5,313,743 A * 5/1994 Peschik .................. B24B 55/02
  451/449
10,086,487 B2 * 10/2018 Itou ..................... B23Q 11/0046
(Continued)

FOREIGN PATENT DOCUMENTS

CN    106736825 A    5/2017
EP     1004396 A1    5/2000
(Continued)

OTHER PUBLICATIONS

Extended Search Report issued for the counterpart EP application No. 21753192 on Jan. 15, 2024.
(Continued)

*Primary Examiner* — David Earl Ogg
(74) *Attorney, Agent, or Firm* — IP Business Solutions, LLC.

(57) ABSTRACT

An information processing device of the present disclosure is for controlling a liquid discharger included in a machine tool discharging liquid so as to move chips occurring from a workpiece. The information processing device includes an image acquiring portion, a detector, a position acquiring portion, and a controller. The position acquiring portion can acquire first position information of a movable portion when imaged by an imaging device and second position information of the movable portion after the movable portion moves from the first position information, and the controller controls at least one of a position, orientation, and discharge pressure of the liquid discharger based on (i) a position of the target when imaged by the imaging device, and (ii) the first position information and (iii) the second position information acquired by the position acquiring portion, when the target moves as a result of movement of the movable portion.

5 Claims, 9 Drawing Sheets

(56) References Cited

U.S. PATENT DOCUMENTS

| | | |
|---|---|---|
| 2016/0184947 A1 | 6/2016 | Itou |
| 2016/0236351 A1* | 8/2016 | Kunihiro ................ B25J 9/1697 |
| 2017/0043442 A1 | 2/2017 | Takikawa |
| 2017/0144262 A1* | 5/2017 | Okuda ................ B05B 13/0431 |
| 2018/0250783 A1* | 9/2018 | Inaba ................ G05B 19/4065 |
| 2018/0272498 A1* | 9/2018 | Chang ................... B23Q 1/015 |

FOREIGN PATENT DOCUMENTS

| | | | |
|---|---|---|---|
| GB | 2259267 A | | 3/1993 |
| JP | 2016-120589 A | | 7/2016 |
| JP | 2014263099 A | * | 7/2016 |
| JP | 2017-035765 A | | 2/2017 |

OTHER PUBLICATIONS

International Preliminary Report Patentability mailed on Aug. 25, 2022 in the prior PCT application No. PCT/JP2021/002589.

* cited by examiner

INFORMATION PROCESSING DEVICE AND INFORMATION PROCESSING SYSTEM

CROSS-REFERENCE TO RELATED APPLICATIONS

This is a continuation application of International Application No. PCT/JP2021/002589, with an international filing date of Jan. 26, 2021, which claims priority of Japanese Patent Application No. 2020-021367 filed on Feb. 12, 2020, each of the content of which is incorporated herein by reference in its entirety.

TECHNICAL FIELD

The present disclosure relates to an information processing device and an information processing system.

BACKGROUND ART

When a workpiece to be processed is processed by a machine tool, coolant liquid may be discharged to a predetermined place. When the deposition amount of chips occurring from the workpiece by processing increases, the continuation of processing is difficult. Therefore, in the machine tool, the chips occurring in processing are removed by discharging liquid such as coolant liquid. JP 2016-120589 A describes a technique of detecting the deposition situation of chips inside a machine and cleaning a place determined that the chips are required to be removed.

SUMMARY

However, various mechanisms are driven by a drive mechanism inside the machine tool, and the position of a target to which liquid is discharged also moves during processing. It is difficult to discharge the liquid with respect to the target thus moving.

Therefore, an object of the present disclosure is to accurately discharge liquid with respect to a moving target.

An information processing device of the present disclosure is an information processing device for controlling a liquid discharger which discharges liquid so as to move chips occurring from a workpiece in a machine tool, comprising: an image acquiring portion configured to acquire image data of an inside of the machine tool, imaged by an imaging device; a detector configured to detect a target to which the liquid is discharged by the liquid discharger from the image data; a position acquiring portion configured to acquire position information of a movable portion installed in the machine tool, the movable portion being configured so that the workpiece is disposed thereon and the workpiece can move; and a controller configured to control the liquid discharger which is installed in the machine tool and which discharged the liquid toward the target associated with the movable portion, wherein: the position acquiring portion can acquire first position information of the movable portion when imaged by the imaging device and second position information of the movable portion after the movable portion moves from the first position information; and the controller controls at least one of a position, orientation, and discharge pressure of the liquid discharger based on (i) a position of the target when imaged by the imaging device, and (ii) the first position information and (iii) the second position information acquired by the position acquiring portion, when the target moves as a result of movement of the movable portion.

The present disclosure can also provide an information processing system.

These general and specific aspects may be achieved by a system, a method, a computer program, and a combination thereof.

According to the present disclosure, liquid can be accurately discharged with respect to a moving target.

DETAILED DESCRIPTION

Figure 1:
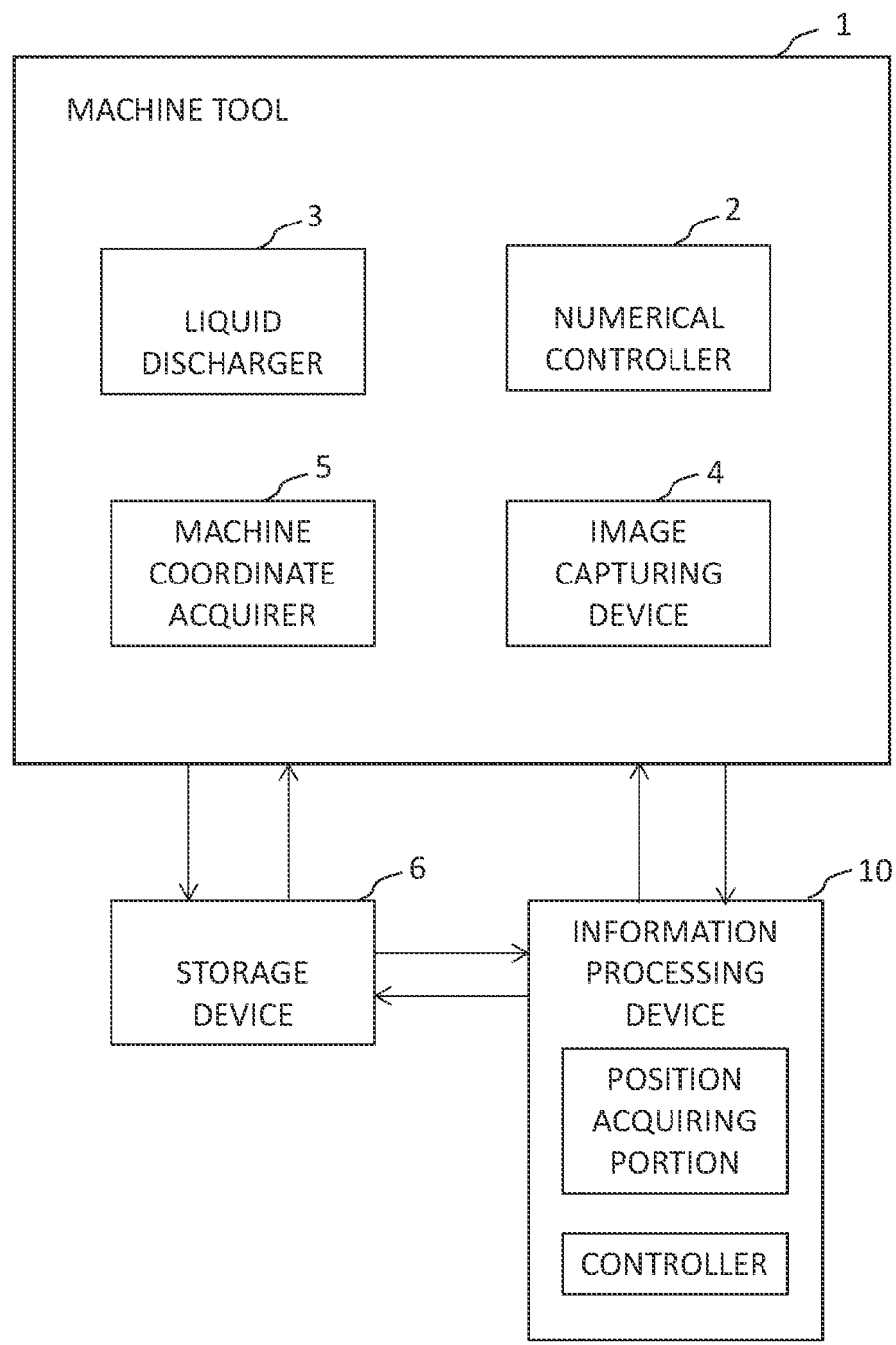
FIG. 1 is a block diagram illustrating the configuration of a machine tool.

Hereinafter, an information processing device, a machine tool, and an information processing system according to each embodiment will be described with reference to the drawings. In the following description, the same components are denoted by the same reference numerals, and the description thereof is omitted.

In the "machine tool" described below, a workpiece composed of a metal to be processed, or the like is processed into a desired shape by cutting or grinding or the like. The "information processing device" and the "information processing system" cause a liquid discharger provided in the machine tool to discharge liquid to a predetermined target position.

Here, the phrase "target associated with a movable portion" means, for example, chips occurring from a workpiece during processing, and particularly, chips associated with a moving member such as a (processing) table. The phrase "associated with" means a state where the chips also move with the movement of the movable portion, such as a case where the chips are placed on the movable portion, a case where the chips are placed on a workpiece or the like placed on the movable portion, or a case where the chips are caught by the movable portion. By discharging the liquid to the chips, the chips can be caused to move to remove unnecessary chips. For example, the "target position" is a position to which liquid is discharged, and basically corresponds to the position of chips to be removed.

First Embodiment

<Machine Tool>

An example of a machine tool 1 according to a first embodiment will be described with reference to FIG. 1. The machine tool 1 processes a workpiece to be processed. By processing the workpiece, chips occurring from the separation of a part of the workpiece are accumulated inside the machine tool 1. For example, the machine tool 1 includes a numerical controller 2 that performs drive control of a main shaft to perform processing, a liquid discharger 3 that discharges liquid for causing chips occurring during processing to move, an imaging device 4 that obtains an image of the inside of the machine tool 1, and a machine coordinate acquirer 5. For example, the machine tool 1 is connected to an information processing device 10 that executes output of a signal for discharging the liquid, or the like, and a storage device 6 that stores control signals and calculation results from the machine tool 1 and the information processing device 10.

The numerical controller 2 transmits control signals of a motor or the like of the machine tool 1 to units. Among these control signals, a signal related to the control of the liquid discharger 3 is generated based on processes of the information processing device 10 as described later, and generates a control signal of a motor or the like from the transmitted signal. The signal generated and transmitted by the information processing device 10 is used as it is as the control signal.

The liquid discharger 3 discharges the liquid to a predetermined target position of the machine tool 1 under the control of the numerical controller 2. The liquid discharger 3 includes, for example, a nozzle that can discharge the liquid, an actuator that drives the nozzle, and a pump that pumps the liquid from a liquid storage that stores the liquid, and discharges the liquid from the nozzle to the chips. The liquid may be coolant liquid for cooling and lubricating a workpiece and a processing unit that generate heat during processing, and the like. As a result, the machine tool 1 can cool the target position requiring cooling. This liquid may cause the chips accumulated inside the machine tool 1 to move, or may cause the chips to move using the coolant liquid. The machine tool 1 collects the chips caused to move utilizing the discharge of the liquid in this manner, whereby the chips can be discharged to the outside of a processing region. The liquid discharger 3 can discharge the liquid over a wide range inside the machine tool 1, whereby, for example, the position and orientation of the nozzle, and the discharge pressure of the liquid can be adjusted. The machine tool 1 can include a plurality of liquid dischargers 3.

Figure 2:
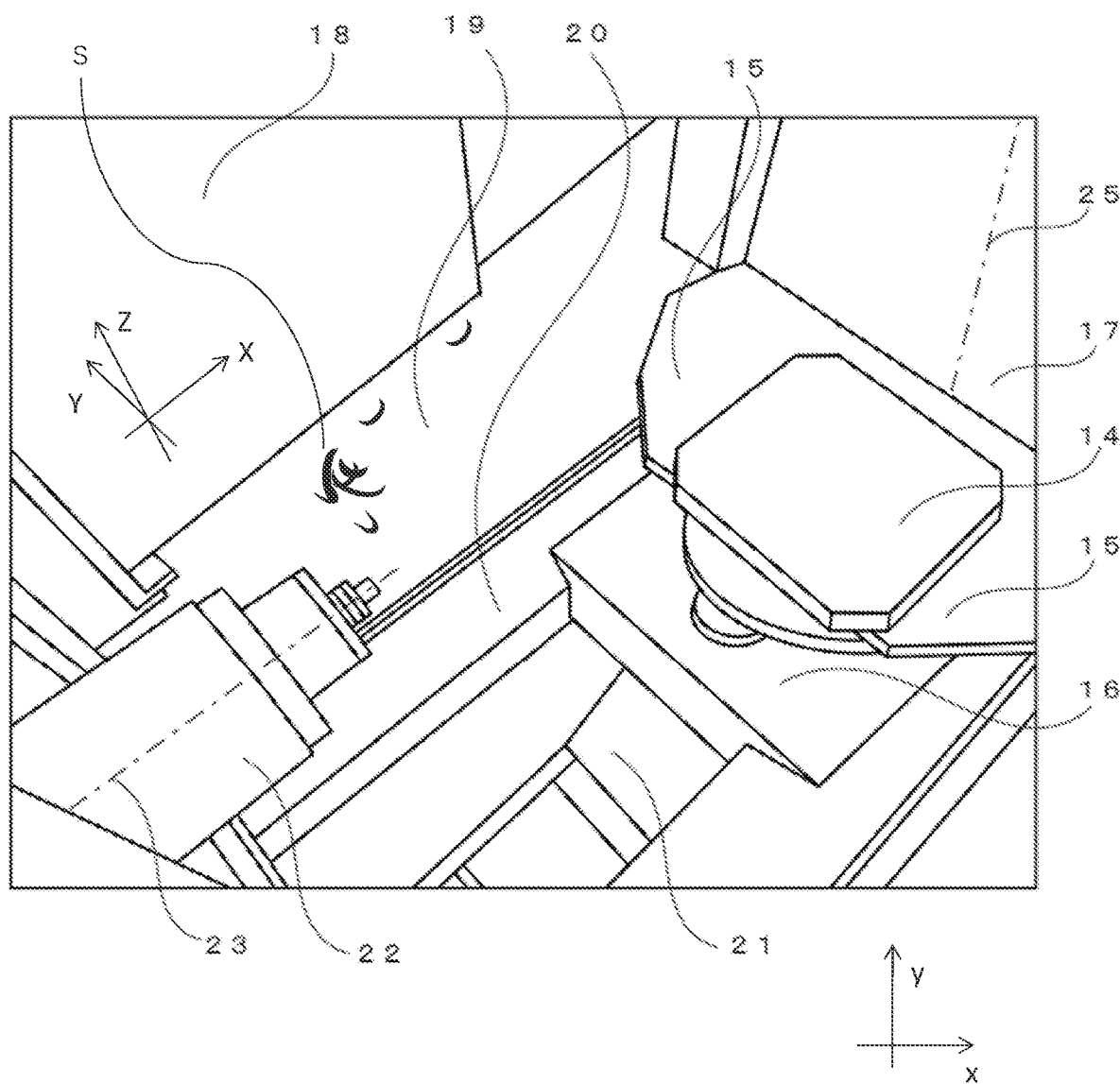
FIG. 2 is an image of the inside of a machine tool.

Specifically, the liquid discharger 3 receives a control signal for causing the nozzle to move from the information processing device 10. Here, the control signal for causing the nozzle to move includes the moving amount of the nozzle in an X coordinate direction and the moving amount of the nozzle in a Y coordinate direction. In an example illustrated in FIG. 2, an XY coordinate is parallel to a table 16, and a Z coordinate is perpendicular to the table 16. Here, since the nozzle itself cannot move in the Z coordinate direction, an example in which the control signal for causing the nozzle to move does not include a movement amount in the Z coordinate direction will be described. The liquid discharger 3 discharges the liquid according to a control signal generated by the information processing device 10 after the table 16 described later with reference to FIG. 2 is caused to move. In FIG. 2, an XYZ coordinate is a machine coordinate, and the xy coordinate is an image coordinate of an image imaged by the imaging device 4. The xy coordinate of this image is used in the information processing device 10 described later together with the XYZ coordinate.

The imaging device 4 is, for example, a camera including an image capturing element such as a CCD or a CMOS. The imaging device 4 can obtain an image of the inside of the machine tool 1 at a predetermined timing. In the imaging device 4, an target area that is an internal image of the machine tool 1 is set as an imaging range. In the target area, the chips occurring from the workpiece are detected. The imaging device 4 outputs the obtained image data to the information processing device 10. For example, the imaging device 4 obtains an image of the workpiece at a periodic timing during processing. The imaging device 4 may obtain an image at a timing before the processed workpiece is removed from the machine tool 1 and a new workpiece is placed. The machine tool 1 can include a plurality of imaging devices 4 in order to be able to grasp a state in a wide range.

The machine coordinate acquirer 5 acquires machine coordinates representing positions inside the machine tool 1 for moving parts such as a pallet 14, a table 16, and a main shaft 22 described later with reference to FIG. 2 in the structure of the machine tool 1. The machine coordinate acquirer 5 transmits the acquired machine coordinates to the information processing device 10. The machine coordinates may be acquired using, for example, position information included in a control signal generated for control by the numerical controller 2 for processing, or using some type of sensor.

Although not illustrated in FIG. 1, the machine tool 1 further includes various components described with reference to FIG. 2. FIG. 2 illustrates an image of the inside of the machine tool 1, and illustrates a pallet 14, a cover 15, a table 16, a pivoted door 17, a side surface 18, a slope 19, a protector 20, a chute 21, and a main shaft 22. In the present embodiment, when a long shaft 23 of the main shaft 22 illustrated in FIG. 2 is set in a front-rear direction inside the machine tool 1. The root side of the main shaft 22 is defined as a front side, and the tip side of the main shaft 22 is defined as a rear side. A horizontal direction orthogonal to the main shaft 22 is defined as a right-and-left direction, and a vertical direction orthogonal to the long shaft 23 is defined as an upper-lower direction.

The pallet 14 is a table on which a workpiece is placed and fixed. The machine tool 1 can be provided with a plurality of pallets 14. Accordingly, when the workpiece to be processed is changed, the workpiece can be changed by changing the palette 14, whereby time efficiency can be improved.

The cover 15 is a component located on each of the right and left sides of the pallet 14. The table 16 can move in the front-rear direction, whereby the workpiece fixed on the pallet 14 can be caused to move. At least a part of the table can be rotated in the horizontal direction, whereby the workpiece fixed on the pallet can be rotated.

The table 16 is a component to which the pallet 14 can be attached. The table 16 can move in the front-rear direction, whereby the workpiece fixed on the pallet 14 can be caused to move. At least a part of the table 16 can be rotated in the horizontal direction, whereby the workpiece fixed on the pallet 14 can be rotated.

The pivoted door 17 is a door that can be rotated about an axis 25. When the pivoted door 17 is rotated, the cover 15 separates the pallet 14 from the table 16, and the pivoted door 17 is rotated together with the pallet 14 and the cover 15. As a result, the pallet 14 on which the workpiece has been processed can be carried out to a pallet storage, and the pallet 14 on which the workpiece to be processed next has been fixed can be carried into the machine tool 1 from the pallet storage. The cover 15 may be provided on each of both the inner and storage portion sides of the machine tool 1 of the pivoted door 17, to rotate the pivoted door 17 by 180°, whereby the pallet 14 is simultaneously carried out and into.

The side surface 18 is an openable wall of the machine tool 1. The side surface 18 partitions the inside of the machine tool 1 from the outside thereof. When the side surface 18 is opened, an operator can enter the inside of the machine tool 1. The side surface 18 (not illustrated) at a position facing the side surface 18 partitions the inside of the machine tool 1 from a tool storage. The tool partition unit stores a plurality of tools. During processing, the side surface 18 is opened as necessary, and the tool attached to the main shaft 22 can be replaced with another tool stored in the tool storage.

The chute 21 is a place where chips flow during cleaning. The side surface 18 and the protector 20 are provided under the pivoted door 17 and the side surface 18, and are each inclined downward toward the chute 21 so that the chips easily flow toward the chute 21.

A tool is attached to the tip of the main shaft 22, and the tool is rotated about a long shaft 23, whereby the workpiece can be processed. In the present embodiment, as illustrated in FIG. 2, the main shaft 22 has a cylindrical outer shape.

<Information Processing Device>

Figure 3:
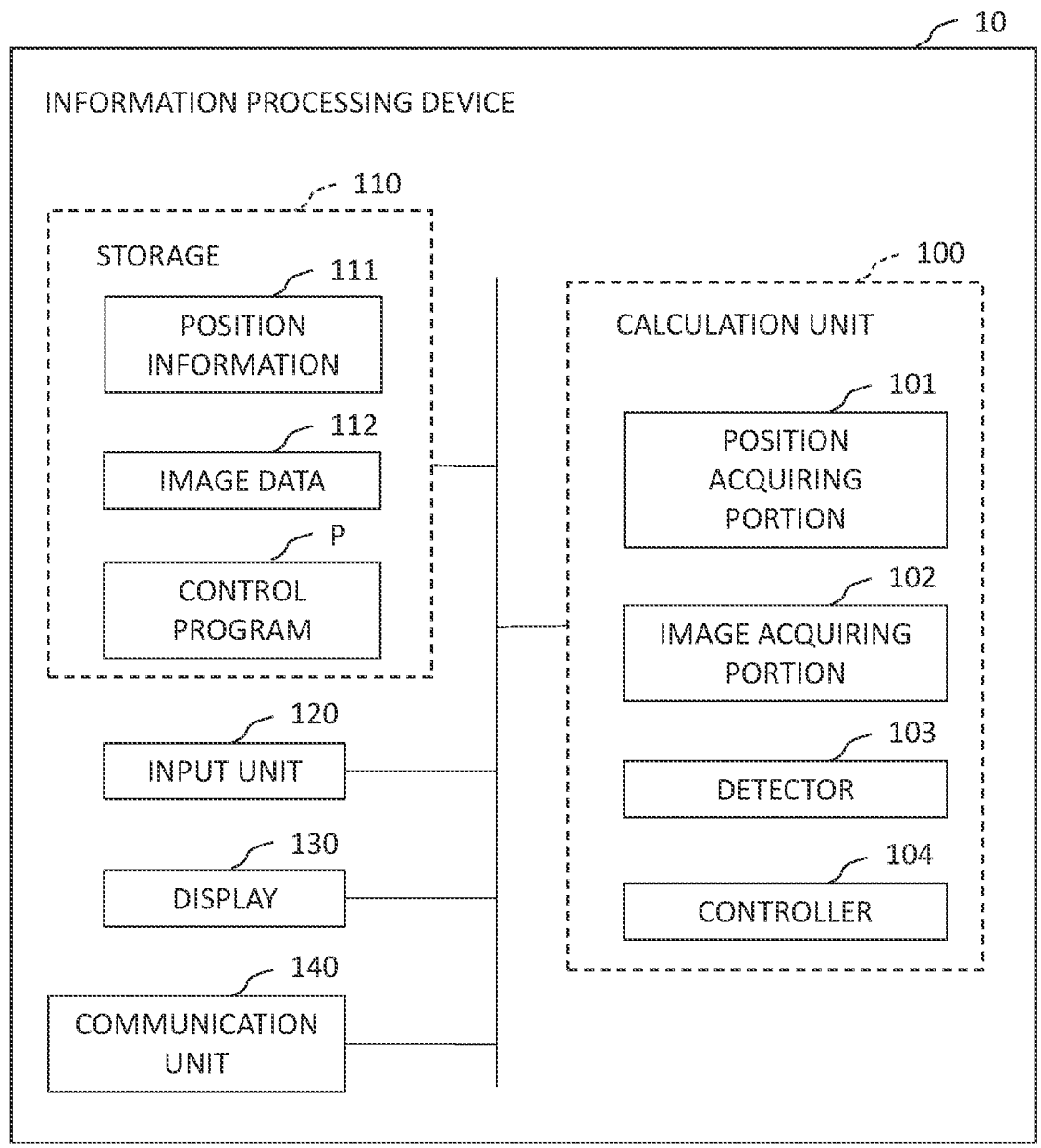
FIG. 3 is a block diagram illustrating the configuration of an information processing device according to a first embodiment.

An example of the information processing device 10 according to the embodiment will be described with reference to FIG. 3. The information processing device 10 detects an target to be detected from imaged data an image of the inside of the machine tool 1. Specifically, the information processing device 10 includes a calculation unit 100, a storage 110, an input unit 120, a display 130, and a communication unit 140. The information processing device 10 is, for example, an information processing device such as a computer or a tablet terminal.

The calculation unit 100 is a controller that controls the entire information processing device 10. For example, the calculation unit 100 reads and executes a control program P stored in the storage 110 to execute processes as a position acquiring portion 101, an image acquiring portion 102, a detector 103, and a controller 104. The calculation unit 100 is not limited to one that achieves a predetermined function according to the cooperation of hardware and software, and may be a hardware circuit exclusively designed for achieving the predetermined function. That is, the calculation unit 100 can be achieved by various processors such as a CPU, an MPU, a GPU, an FPGA, a DSP, and an ASIC.

The storage 110 is a recording medium that records various types of information. The storage 110 is achieved by, for example, a RAM, a ROM, a flash memory, a solid state device (SSD), a hard disk, other storage devices, or an appropriate combination thereof. The storage 110 stores various data and the like used in the machine tool 1 in addition to the control program P executed by the calculation unit 100. For example, the storage 110 stores position information 111 and image data 112. Here, an example in which the position information 111 and the image data 112 are stored in the storage 110 is illustrated, but it is not limited thereto. Specifically, the storage device 6 illustrated in FIG. 1 may be configured to store the position information 111 and the image data 112.

The input unit 120 is an input unit such as a keyboard, a mouse, or a touch panel used for inputting data and operation signals. The display 130 is an output unit such as a display used to output data.

The communication unit 140 is an interface circuit (module) for enabling data communication with an external device (not illustrated). For example, the communication unit 140 can execute data communication with the imaging device 4 that obtains image data.

The position acquiring portion 101 acquires, as the position information 111, necessary information, among the machine coordinates acquired by the machine coordinate acquirer 5, and causes the storage 110 to store the position information. For example, the position acquiring portion 101 acquires the position information 111 of the table 16 which is a movable portion provided in the machine tool 1. For example, the position acquiring portion 101 sets the information of the position (first position) of the table 16 when imaged by the imaging device 4 as first position information. The position acquiring portion 101 sets the information of a position (second position) of the table 16 after the table 16 moves from the first position as second position information.

The image acquiring portion 102 acquires the image data 112 of the inside of the machine tool 1 imaged by the imaging device 4, and causes the storage 110 to store the image data. Here, for example, the acquisition of the position information 111 by the position acquiring portion 101 and the acquisition of the image data 112 by the image acquiring portion 102 are executed in synchronization, and the position information 111 and the image data 112 are stored in association with, for example, identification information and time information, whereby correspondence between the simultaneously acquired position information 111 and image data 112 can be achieved. Information on a correspondence relationship among an xy coordinate that is an image coordinate of the image data 112, an XYZ coordinate that is a machine coordinate, and a positional relationship of the table 16 is stored in advance in the storage device 6. For example, the imaging field of view of the imaging device 4 inside the machine tool 1 is specified, whereby the correspondence relationship among the XYZ coordinate, the xy coordinate, and the table 16 can be set. The information processing device 10 can execute various processes to be described later using the correspondence relationship stored in the storage device 6. For example, the information processing device 10 can specify the XYZ coordinate that is a machine coordinate based on the xy coordinate of a target image obtained by the imaging device 4 and the position of the table 16.

The detector 103 detects a target to which the liquid is discharged by the liquid discharger 3 using the image data 112. For example, the detector 103 can target chips to which the liquid is discharged, using a technique of image recognition, and detect the chips. By converting a coordinate on the detected target image data 112 into a coordinate inside the machine tool 1, the positions of the chips in the machine tool 1 can be obtained. Here, the correspondence between each coordinate of the image data 112 imaged by the imaging device 4 and each coordinate inside the machine tool 1 is determined in advance, and the coordinate of the image data 112 is specified, whereby the corresponding coordinate inside the machine tool 1 can be obtained.

The controller 104 controls the liquid discharger 3 that discharges the liquid toward the target inside the machine tool 1. Specifically, the controller 104 outputs a signal requesting the numerical controller 2 to output a control signal to the liquid discharger 3. Therefore, for example, when the target moves due to the movement of the table 16, the controller 104 can control at least one of the position, orientation, and discharge pressure of a nozzle 31 of the liquid discharger 3 based on the position information 111 acquired by the position acquiring portion 101.

When the target moves due to the movement of the table 16, the controller 104 controls at least one of the position, orientation, and discharge pressure of the nozzle 31 of the liquid discharger 3 based on the position information of the target imaged by the imaging device 4, the first position information when the table acquired by the position acquiring portion 101 is imaged, and the second position information after the movement. For example, when the time of acquisition of the image data 112 is taken as a reference time, the controller 104 obtains the position of the target inside the machine tool 1 at the reference time from the coordinate in the image data 112 at the reference time detected by the detector 103. The controller 104 specifies the change amount of the target inside the machine tool 1 in a predetermined period from the reference time to the time of discharging the liquid. For example, the controller 104 can specify the change amount of the target within a predetermined period using the position information 111 from the reference time to the time of discharging the liquid and the control signal to each moving mechanism. Furthermore, the controller 104 obtains the position of the target at the time of discharging from the position at the reference time and the specified change amount, and outputs a signal to the numerical controller 2 to control the nozzle of the liquid discharger 3 with respect to the obtained position.

Figure 4:
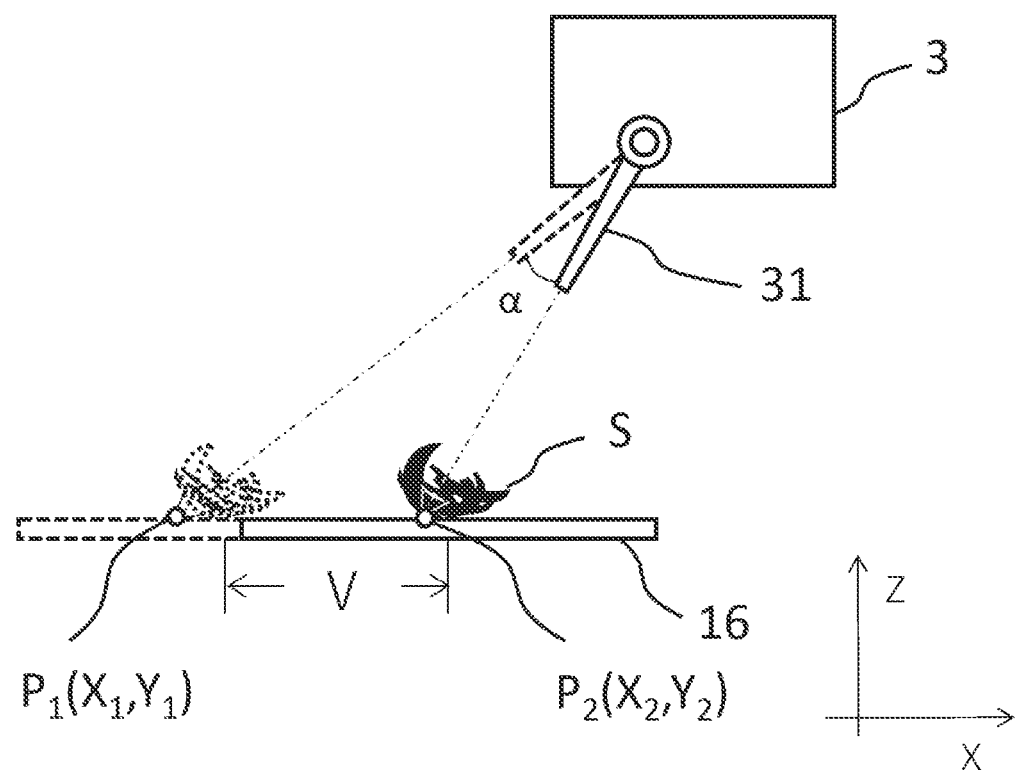
FIG. 4 is a schematic view describing a change in the position of a target and control of liquid discharge.

In FIG. 4, the table 16 and a target S before the movement as the reference time are indicated by broken lines, and the table 16 and the target S after the movement at the time of discharging the liquid are indicated by solid lines. In this manner, the target S moves in association with the movement of the table 16 as the movable portion. That is, since the target is present on the table 16, the position of the target follows the movement of the table 16. In such a case, the controller 104 can control the nozzle 31 of the liquid discharger 3 using the position of the target S determined according to the position of the target S at the reference time and a change amount V from the reference time of the table 16 to the time of discharging the liquid.

For example, as illustrated in FIG. 4, when the target S is positioned on the table 16 that horizontally moves, and the movable portion horizontally moves from the reference time to the time of discharging the liquid, the controller 104 obtains an angle α formed by a point $P_1$ ($X_1$, $Y_1$) on the table 16 of a straight line connecting the nozzle 31 at the reference time and the target S and a point $P_2$ ($X_2$, $Y_2$) on the table 16 of a straight line connecting the nozzle at the time of discharging and the target S using a horizontal movement distance that is the change amount V, and can control the nozzle 31 according to the obtained angle α. That is, the coordinate of the point $P_1$ ($X_1$, $Y_1$) is the first position information, and the coordinate of the point $P_2$ ($X_2$, $Y_2$) is the second position information. The first position information is converted into an XYZ coordinate that is a machine coordinate by using an xy coordinate on an image imaged by the imaging device 4 and the position of the table 16. Since a Z coordinate is not changed, the Z coordinate is omitted in FIG. 4.

The information processing device 10 of the present embodiment has been described in a form in which a device separate from the machine tool 1 is present, but the present invention is not limited thereto. The machine tool 1 may have a form in which the information processing device 10 is incorporated therein. For example, all or part of the data stored in the storage 110 may be stored in an external recording medium connected via a network. The information processing device 10 may be configured to use the data stored in the external recording medium.

<Specification of Position to be Detected and Process of Liquid Discharge>

Figure 5:
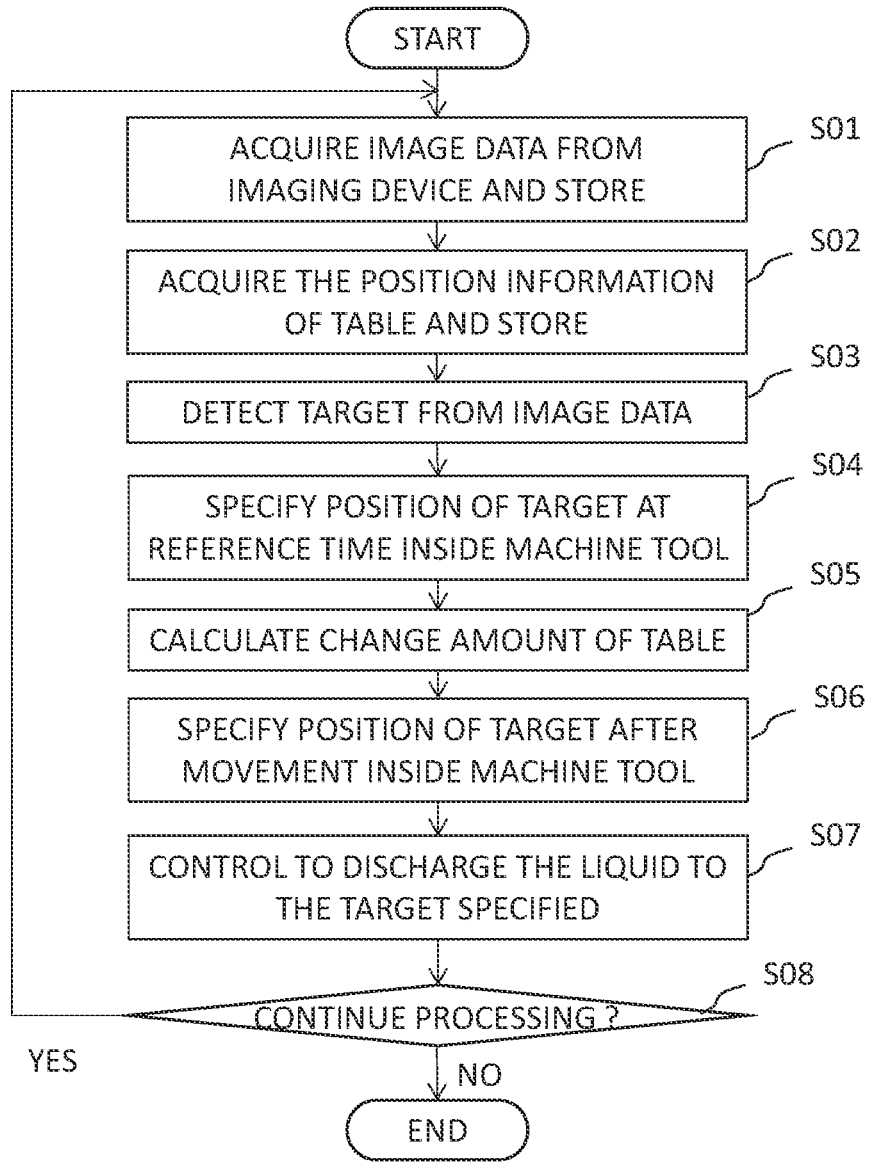
FIG. 5 is a flowchart describing the specification of a position to be detected and a process of liquid discharge in the information processing device according to the first embodiment.

A process of controlling liquid discharge in the information processing device 10 according to the first embodiment will be described with reference to a flowchart illustrated in FIG. 5. First, the image acquiring portion 102 acquires the image data 112 imaged by the imaging device 4, and causes the storage 110 to store the image data (S01).

The position acquiring portion 101 acquires the position information of the table 16 on which the target is controlled, and causes the storage 110 to store the position information (S02).

The detector 103 detects a target from the image data 112 at the reference time (S03).

The controller 104 specifies the position of the target at the reference time inside the machine tool 1 using the position of the target on the image data 112 detected in step S03 (S04).

The controller 104 calculates the change amount of the table from the reference time to the time of discharging the liquid (S05).

The controller 104 specifies the position of the target at the time of discharging the liquid using the coordinate of the target specified in step S04 and the change amount calculated in step S05 (S06).

The controller 104 performs control to discharge the liquid to the target specified in step S06 (S07). Specifically, a signal for requesting the discharge of the liquid is output to the numerical controller 2. As a result, the numerical controller 2 outputs a control signal to the liquid discharger 3. The liquid discharger 3 discharges the liquid to the target.

Thereafter, when the processing in the machine tool 1 ends (NO in S08), the controller finishes processing. Meanwhile, when the processing in the machine tool 1 continues (YES in S08), the information processing device 10 returns to step S01, and repeats steps S01 to S08.

As described above, the information processing device 10 specifies the destination of the target in accordance with the position of the target specified from the image data 112 and the change amount V of the table 16 as a movable portion to control the liquid discharger 3. This makes it possible to improve the accuracy of the discharge of the liquid.

Second Embodiment

Figure 6:
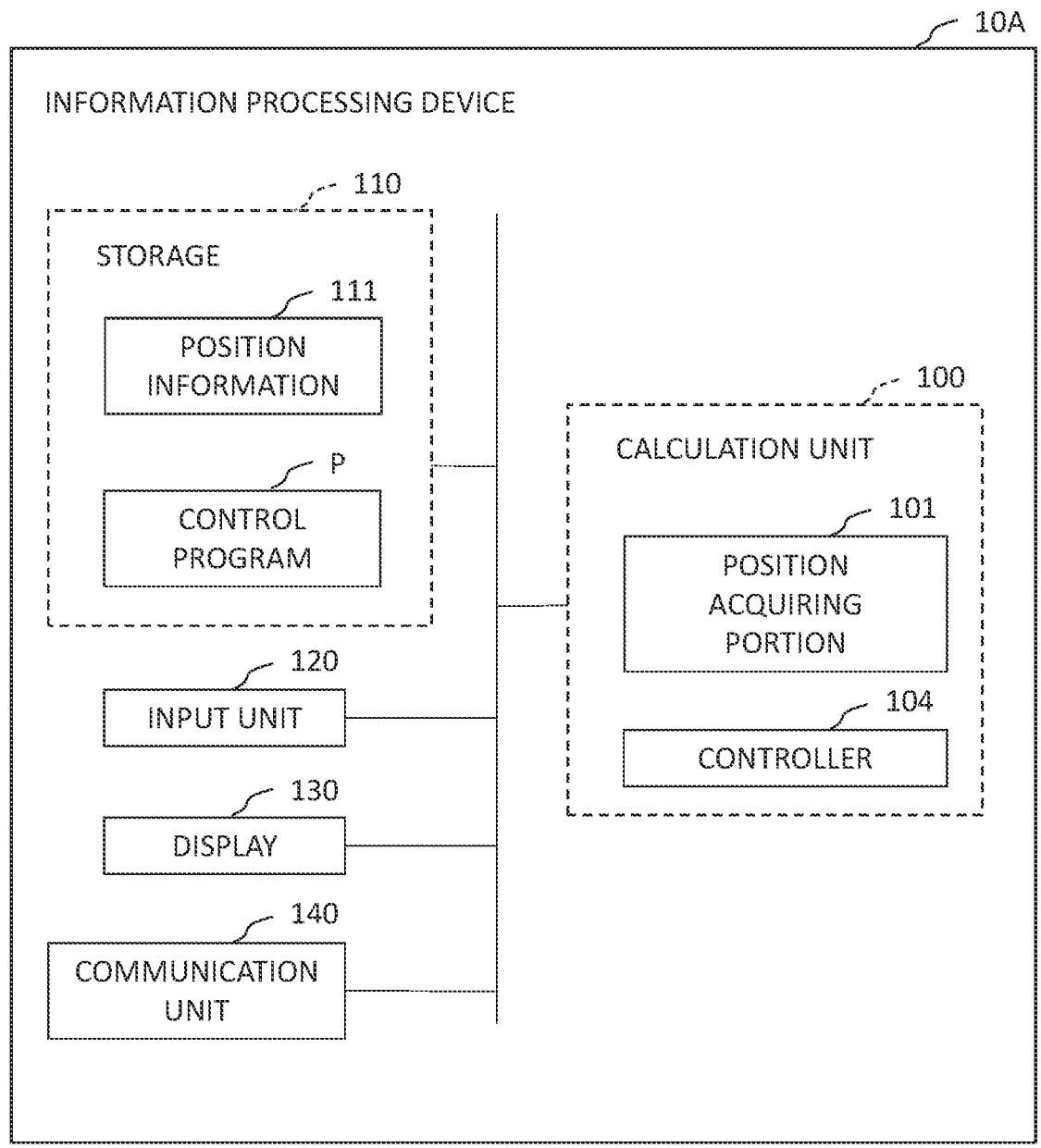
FIG. 6 is a block diagram illustrating the configuration of an information processing device according to a second embodiment.

An information processing device 10A according to the second embodiment will be described with reference to FIG. 6. The information processing device 10A according to the second embodiment controls a liquid discharger 3 using position information set in advance without using an image of the inside of a machine tool 1. Specifically, in the information processing device 10A, the position of a target to which liquid is discharged is determined in advance with reference to a table 16 that is a movable portion. For example, a certain position of the table 16 is set in advance as the position of the target. Position information 111 includes information for specifying the state of the table 16. Therefore, a controller 104 controls the liquid discharger 3 using a predetermined position of the target and the position information 111 acquired by a position acquiring portion 101.

That is, example, for the information processing device 10A can target not an target that can be changed according to a situation such as chips occurring during processing, but a position remaining unchanged and fixed in advance with respect to the table 16. Such a target is set in advance according to, for example, the type and shape of a workpiece, the type of a tool used in the machine tool 1, and a processed product obtained by processing due to the machine tool 1, and the like. That is, this is because a place where the chips are accumulated is specified to some extent by the workpiece, the tool, or the processed product.

Therefore, the information processing device 10A is different from the information processing device 10 described above with reference to FIG. 3 in that the image acquiring portion 102, the detector 103, and the image data 112 are not required. Since the liquid discharge can be controlled even when the image data is not used, the illustration of the image acquiring portion 102, the detector 103, and the image data 112 is omitted in FIG. 6, but it is not limited thereto. For example, the position of the chips detected from the image data 112 and the above-described position set in advance may be used together, and used in the liquid discharger 3. The information processing device 10A may use the image data 112 for a purpose other than the liquid discharge.

The controller 104 specifies the position of the target at the reference time using the position information 111 acquired by the position acquiring portion 101. The controller 104 specifies the change amount of the target from the reference time to the time of discharging the liquid, obtains the position of the target at the time of discharging, and controls a nozzle of the liquid discharger 3 with respect to the obtained position. Specifically, for example, the information processing device 10 causes a storage 110 to store a positional relationship between the table 16 as a movable portion and the target. Therefore, the controller 104 can specify the position of the target at the reference time using this relationship and the position information 111 acquired by the position acquiring portion 101, and obtain the destination of the target.

Figure 7:
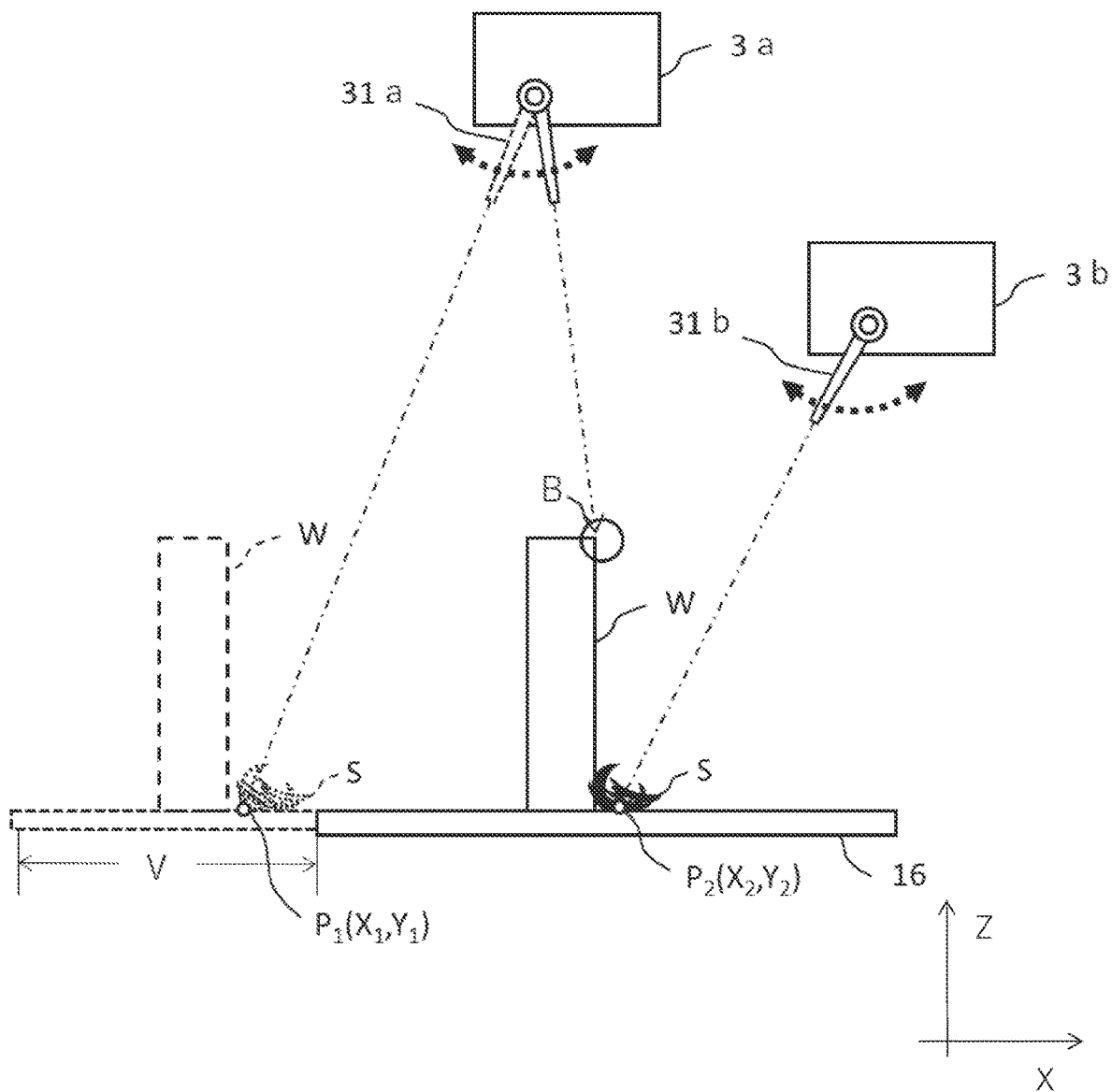
FIG. 7 is a schematic view describing a change in the position of a target and control of liquid discharge.

As illustrated in FIG. 7, when the liquid discharger 3 includes a first nozzle 31a used for discharging the liquid and a second nozzle 31b installed at a position different from the first nozzle 31a, the information processing device 10A may output a signal to control the nozzle selected from the two nozzles 31a and 31b. For example, when no obstacle is present in a path from the first nozzle 31a to the target to which the liquid is discharged, the controller 104 performs control to discharge the liquid from the first nozzle 31a. When the obstacle is present in the path from the first nozzle 31a to the target, the controller 104 performs control to discharge the liquid from the second nozzle 31b. Characters 3a and 3b in FIG. 7 are each a part of the liquid discharger 3 and are the installation units of the nozzles.

In FIG. 7, as in FIG. 4, the table 16, the target S, and the workpiece W and the like before movement as the reference time are indicated by broken lines, and the table 16, the target S, and the workpiece W and the like after movement as the time of discharging the liquid are indicated by solid lines. In FIG. 7, at the reference time, a point $P_1$ $(X_1, Y_1)$ as the position of the target S is in a liquid discharge path through which the first nozzle 31a can discharge the liquid. However, at the time of discharging the liquid, the workpiece W becomes an obstacle B at a point $P_2$ $(X_2, Y_2)$ as the position of the target S, and is not in the liquid discharge path of the first nozzle 31a. At the time of discharging the liquid, the position of the target S is in the liquid discharge path of the second nozzle 31b.

The information processing device 10A of the present embodiment has been described in a form in which a device separate from the machine tool 1 is present, but the present invention is not limited thereto. The machine tool 1 may have a form in which the information processing device 10A is incorporated therein. For example, all or part of the data stored in the storage 110 may be stored in an external recording medium connected via a network. The information processing device 10A may be configured to use data stored in an external recording medium.

<Specification of Position to be Detected and Process of Liquid Discharge>

Figure 8:
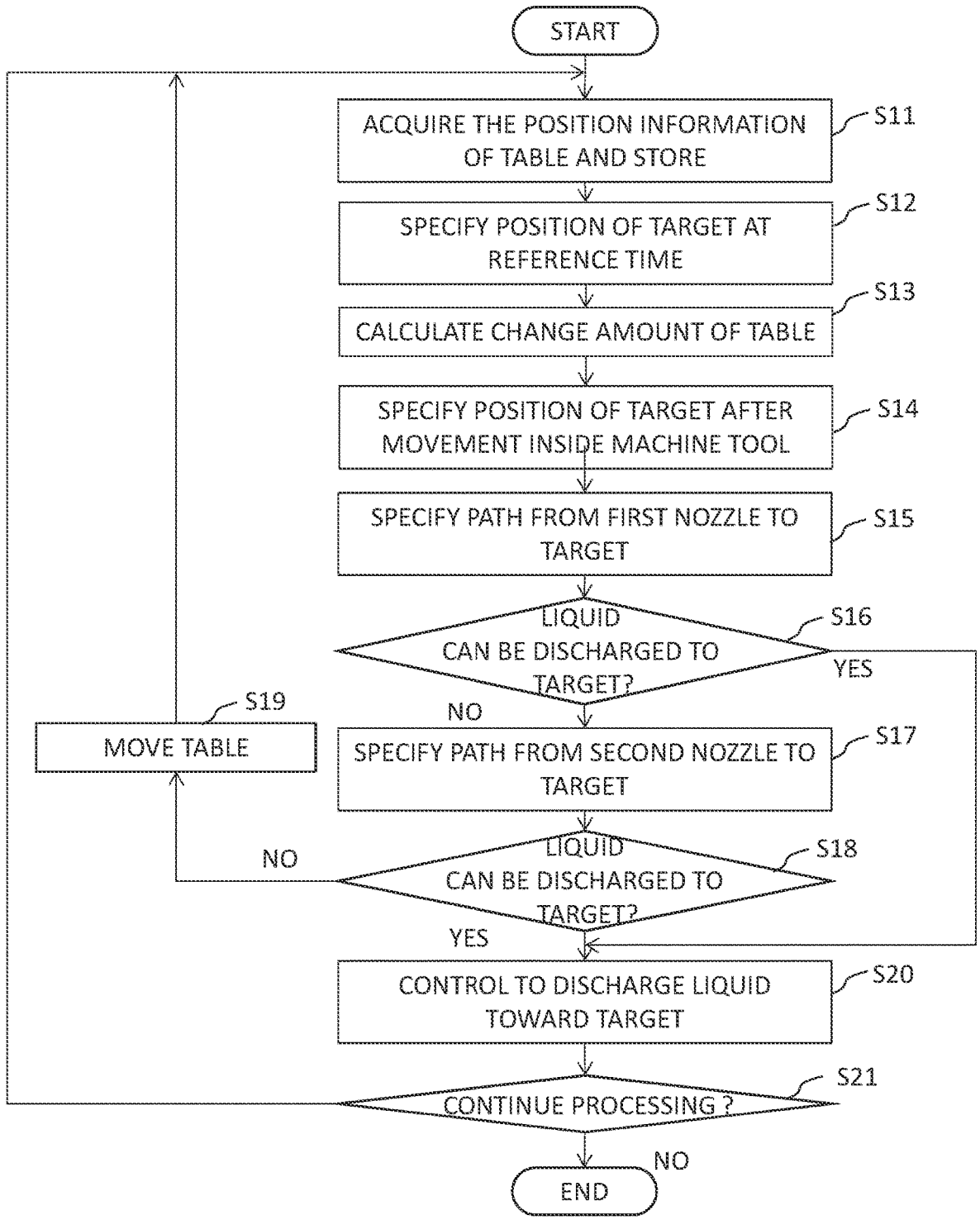
FIG. 8 is a flowchart describing the specification of a position to be detected and a precess of liquid discharge in the information processing device according to the second embodiment.

A process of controlling liquid discharge in the information processing device 10A according to the second embodiment will be described with reference to a flowchart illustrated in FIG. 8. First, the position acquiring portion 101 acquires the position information of the table 16 on which the target is controlled, and causes the storage 110 to store the position information (S11).

The controller 104 specifies the position of the target at the reference time inside the machine tool 1 from the positional relationship stored in advance in the storage 110 (S12). In FIG. 7, the position of the target S is specified based on the information of the position of the table 16, the shape of the workpiece W, and the position of the workpiece W in the table 16.

The controller 104 calculates the change amount V of the table 16 from the reference time to the time of discharging the liquid (S13).

The controller 104 specifies the position of the target after the movement of the table 16 as the time of discharging the liquid using the coordinate of the target specified in step S12 and the change amount calculated in step S13 (S14).

The controller 104 specifies a path of liquid discharge from the first nozzle 31a to the position of the target S after the movement of the table 16 (S15). Specifically, the controller 104 calculates the operating range (position and orientation) of the first nozzle 31a matching the position of the target S at the time of discharging the liquid after the movement of the table 16 with respect to the current orientation of the first nozzle 31a before the movement. A line connecting the first nozzle 31a operated in accordance with the target S and the position of the target S is taken as the path of liquid discharge. When the liquid is emitted from the first nozzle 31a to the target S not in a straight line but in a curved line, the path of the liquid discharge is specified in consideration of the curved line.

As a result of the specification in step S15, the controller 104 determines whether or not the liquid can be discharged from the first nozzle 31a to the target S after the movement of the table 16 (S16). For example, when the target S, which is an obstacle such as the workpiece W, is present on the path of liquid discharge, the controller 104 determines that the liquid cannot be discharged to the target S. For example, in step S15, when the discharge path corresponding to the target S from the first nozzle 31a cannot be specified after the movement of the table 16, specifically, when the liquid does not reach due to a long distance from the first nozzle 31a to the target S, or the like, the controller 104 determines that the discharge path cannot be specified. At this time, the presence or absence of the obstacle can be determined by registering the shape and the like of the workpiece W in the information processing device 10A. That is, in addition to the information on the position and movement amount of the table 16, information on the shape of the workpiece W arranged on the table 16 is also required. In the present embodiment, the determination is made as the presence or absence of the obstacle, but the determination may be made by quantifying the position and movement amount of the table 16, and the shape of the workpiece W and comparing them with the path of liquid discharge.

When the liquid cannot be discharged from the first nozzle 31a to the target S (NO in S16), the path of liquid discharge from the second nozzle 31b to the position of the target S after the movement of the table 16 is specified (S17). Specifically, the controller 104 calculates the operating range (position and orientation) of the second nozzle 31b matching the position of the target S after the movement with respect to the current orientation of the second nozzle 31b before the movement of the table 16. A line connecting the second nozzle 31b operated in accordance with the target and the position of the target S is taken as the path of liquid discharge.

As a result of the specification in step S17, the controller 104 determines whether or not the liquid can be discharged from the second nozzle 31b to the target S after the movement of the table 16 (S18). Also in this case, for example, when the obstacle such as the workpiece W is present on the path of liquid discharge, the controller 104 determines that the liquid cannot be discharged to the target S. Even when the discharge path corresponding to the target S cannot be specified in step S17, the controller 104 determines that the discharge path cannot be specified.

Also for the path of liquid discharge specified in step S17, when the liquid cannot be discharged to the target S (NO in S18), the liquid cannot be discharged to the position of the target S after the movement, whereby the controller 104 causes the table 16 to move, and repeats steps S11 to S18 (S19). Specifically, the controller 104 outputs a signal for requesting the movement of the table 16 to the numerical controller 2. As a result, the table 16 is caused to move, whereby steps S11 to S18 are repeated at the new position of the target S.

Meanwhile, when the liquid can be discharged to the target S by the path specified in step S15 (YES in S16) or when the liquid can be discharged to the target S by the path specified in step S17 (YES in S18), the controller 104 performs control to discharge the liquid toward the target S (S20). Specifically, in the control of the liquid discharge, the controller 104 of the information processing device 10A outputs a signal requesting the discharge of the liquid to the numerical controller 2. As a result, the numerical controller 2 outputs a control signal to the liquid discharger 3. The liquid discharger 3 discharges the liquid to the target S.

Thereafter, when the processing in the machine tool 1 ends (NO in S21), the controller finishes processing. Meanwhile, when the processing due to the machine tool 1 continues (YES in S21), the information processing device 10A returns to step S11, and repeats steps S11 to S21.

Thus, the information processing device 10A specifies the destination of the target set in advance in accordance with the movement of the table 16 as the movable portion. The information processing device 10A can improve the accuracy of liquid discharge.

[Modified Example]

Figure 9:
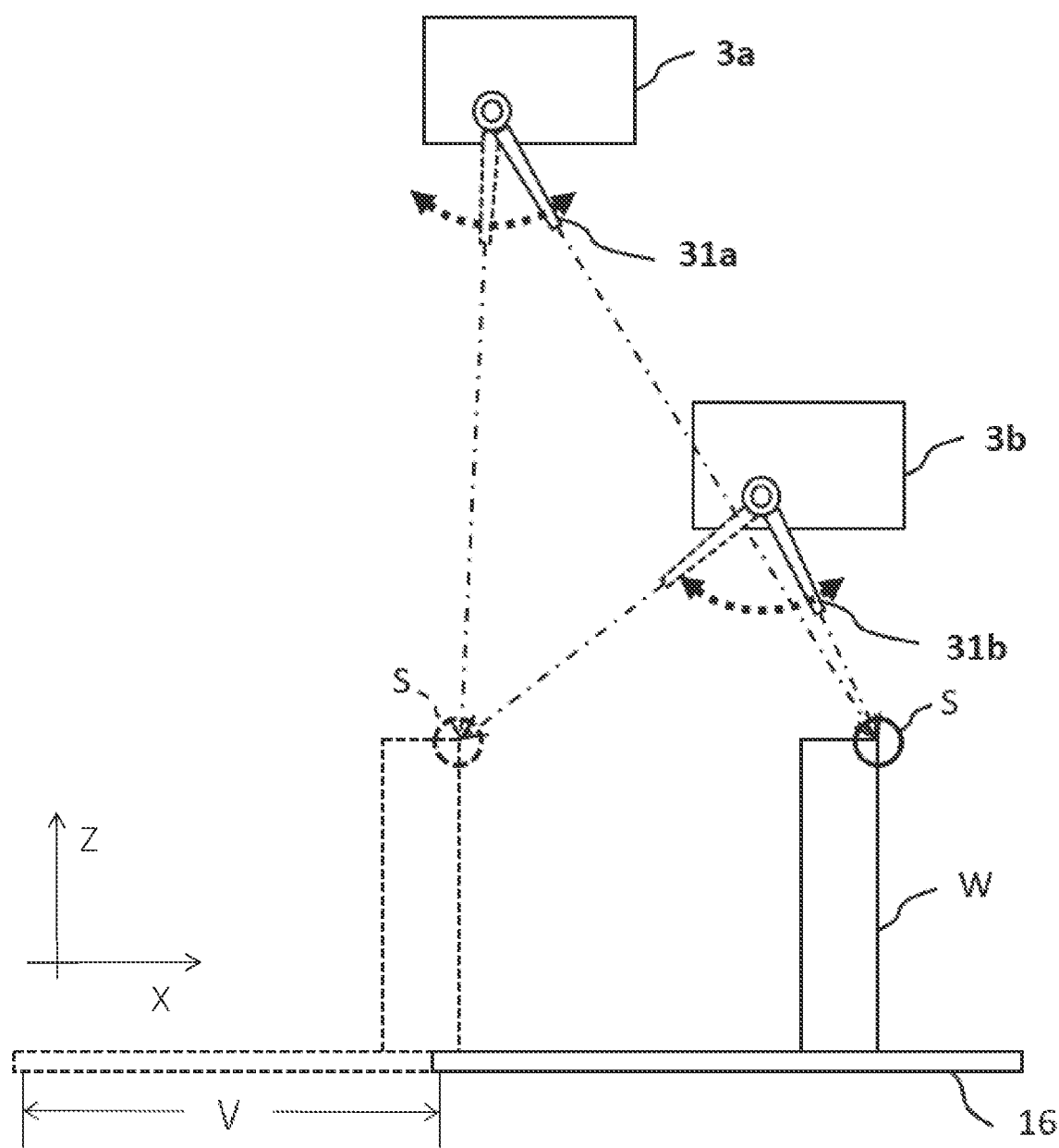
FIG. 9 is a schematic view describing a change in the position of a target and control of liquid discharge.

In addition, a controller 104 may control a nozzle based on the height of a target on a table 16 that is a movable portion. The controller 104 may control the nozzle based on the shape of a workpiece on which the target is located. For example, as illustrated in FIG. 9, liquid may be discharged to a position deviating from a target S based on only the change amount V of the table 16. Therefore, the controller 104 can control a liquid discharger 3 in consideration of the height (Z coordinate) of the target S and the shape of a workpiece W to improve the accuracy of liquid discharge. Examples of controlling the liquid discharger 3 in consideration of the shape of the workpiece W include performing control to cause a nozzle 31 to move when the target enters a shadow of a part of the machine tool 1 due to the movement of the table 16 and the liquid discharged from the nozzle 31 does not reach the target.

Specifically, for example, as illustrated in FIG. 9, the controller 104 causes the first nozzle to discharge the liquid when no obstacle is present in the path from the first nozzle 31a to the target, and causes a second nozzle 31b to discharge the liquid when the obstacle is present in the path from the first nozzle 31a to the target.

In FIG. 9, since the target S such as chips is located on the workpiece, it is necessary to determine the position of the target at the reference time using the shape information of the workpiece W arranged on the table 16 in addition to the information of the position of the table 16. When the processing proceeds based on a processing program, and the table 16 also moves, the position of the target S needs to be determined based on the movement amount of the table 16 and the information on the shape of the workpiece W.

The above embodiments have been described as the illustration of the technique disclosed in the present application. However, the technique in the present disclosure is not limited thereto, and can also be applied to embodiments in which changes, replacements, additions, and omissions and the like are made as appropriate.

The information processing device, the machine tool, and the information processing system according to all claims of the present disclosure are achieved by cooperation and the like with hardware resources, for example, a processor, a memory, and a program.

INDUSTRIAL APPLICABILITY

The information processing device, the machine tool, and the information processing system of the present disclosure are useful for specifying the position to be detected in the machine tool, for example.

The invention claimed is:
1. An information processing device for controlling a liquid discharger which discharges liquid so as to move chips occurring from a workpiece in a machine tool, comprising:
an image acquiring portion configured to acquire image data of an inside of the machine tool, imaged by an imaging device:
a detector configured to detect a target to which the liquid is discharged by the liquid discharger from the image data:
a position acquiring portion configured to acquire position information of a movable portion installed in the machine tool, where a workpiece is to be disposed on the movable portion and is movable along with the movable portion; and
a controller configured to control the liquid discharger which is installed in the machine tool and which discharges the liquid toward the target associated with the movable portion,
wherein the position acquiring portion can acquire first position information of the movable portion when imaged by the imaging device and second position information of the movable portion after the movable portion moves from the first position information; and
the controller controls at least one of a position, orientation, and discharge pressure of the liquid discharger based on (i) a position of the target when imaged by the imaging device, and (ii) the first position information and (iii) the second position information acquired by the position acquiring portion, when the target moves as a result of movement of the movable portion.

2. The information processing device according to claim 1, wherein
the controller controls at least one of the position, the orientation, and the discharge pressure of the liquid discharger according to the position information acquired by the position acquiring portion, when the target moves as a result of movement of the movable portion; and
when the target is located on a horizontally moving movable portion, and the movable portion horizontally moves during a period from time of acquiring image data as a reference time to time of discharging the liquid, the controller obtains an angle formed by a straight line connecting the liquid discharger and the target at the reference time and a straight line connecting the liquid discharger and the target at the time of discharging using a horizontal movement distance, and controls the liquid discharger according to the angle.

3. The information processing device according to claim 2, further comprising:
wherein the controller specifies a change amount of the target from the time of acquiring the image data as the reference time to the time of discharging the liquid, obtains a position of the target at the time of discharging, and controls a nozzle of the liquid discharger with respect to the position.

4. The information processing device according to claim 2, wherein
a target region to which the liquid is discharged is determined in advance with reference to the movable portion; and
the controller specifies a change amount of the target region from the reference time to the time of discharging the liquid, obtains a position of the target region at the time of discharging, and controls the liquid discharger with respect to the position.

5. A machine tool comprising a liquid discharger and configured to cause the liquid discharger to discharge liquid so as to move chips occurring from a workpiece,
the machine tool comprising:
an image acquiring portion configured to acquire image data of an inside of the machine tool, imaged by an imaging device:
a detector configured to detect a target to which the liquid is discharged by the liquid discharger from the image data:
a position acquiring portion configured to acquire position information of a movable portion, where a workpiece is to be disposed on the movable portion and is movable along with the movable portion; and
a controller configured to control the liquid discharger discharging the liquid toward a target associated with the movable portion,
wherein the position acquiring portion can acquire first position information of the movable portion when imaged by the imaging device and second position information of the movable portion after the movable portion moves from the first position information; and
the controller controls at least one of a position, orientation, and discharge pressure of the liquid discharger based on (i) a position of the target when imaged by the imaging device, and (ii) the first position information and (iii) the second position information acquired by the position acquiring portion, when the target moves as a result of movement of the movable portion.

* * * * *